United States Patent [19]
Schneider et al.

[11] Patent Number: 5,470,285
[45] Date of Patent: Nov. 28, 1995

[54] COMPACT CONTINUOUSLY VARIABLE TRANSMISSION LAYOUT FOR REAR WHEEL DRIVE VEHICLES

[75] Inventors: Karl F. Schneider; Stanley K. Dembosky, both of Ithaca, N.Y.; Donn K. Fairbank, Naperville, Ill.; Romas B. Spokas, Ithaca; Bradley L. Keeney, Groton, both of N.Y.

[73] Assignee: Borg-Warner Automotive, Inc., Sterling Heights, Mich.

[21] Appl. No.: 94,612

[22] Filed: Jul. 20, 1993

[51] Int. Cl.⁶ .......................... B60K 17/00; F16H 37/02
[52] U.S. Cl. ................... 475/210; 475/206; 74/665 GE; 180/366
[58] Field of Search ................. 475/59, 66, 207, 475/210, 212, 213, 206; 74/665 GE; 180/366, 374, 376

[56] References Cited

U.S. PATENT DOCUMENTS

| | | | |
|---|---|---|---|
| 4,433,594 | 2/1984 | Smirl | 475/206 |
| 4,467,670 | 8/1984 | Kawamoto | 475/210 X |
| 4,543,852 | 10/1985 | Svab et al. | 475/210 |
| 5,234,073 | 8/1993 | Friedmann et al. | 180/366 X |

FOREIGN PATENT DOCUMENTS

| | | | |
|---|---|---|---|
| 124430 | 7/1984 | Japan | 180/366 |
| 168061 | 6/1990 | Japan | 475/210 |
| 404171343 | 6/1992 | Japan | 74/665 GE |
| 4234629 | 4/1993 | Japan | 74/665 GE |
| 405124446 | 5/1993 | Japan | 475/210 |

Primary Examiner—Khoi Q. Ta
Attorney, Agent, or Firm—Willian Brinks Hofer; Greg Dziegielewski

[57] ABSTRACT

A compact arrangement for a continuously variable transmission and power train system is provided to be used in rear wheel drive vehicles. In one arrangement, the input shaft is in-line with the output shaft. In this arrangement, the input shaft, having a hydraulic pump, is connected to an engine by a torque converter. A first transfer gear assembly transfers power from the input shaft to the adjustable input pulley of a continuously variable transmission assembly. The adjustable input pulley transfers power to an adjustable output pulley through a belt. A second transfer gear assembly transfers power from the adjustable output pulley to an output shaft in-line with the input shaft. A forward and reverse gear system having a compound planetary gear set and clutch on the output shaft provides forward, neutral, and reverse gears.

15 Claims, 10 Drawing Sheets

5,470,285

COMPACT CONTINUOUSLY VARIABLE TRANSMISSION LAYOUT FOR REAR WHEEL DRIVE VEHICLES

BACKGROUND OF THE INVENTION

This invention relates to a continuously variable transmission system for rear wheel drive vehicles and more particularly to a compact arrangement for such a transmission where the continuously variable ratio assembly is offset relative to the engine crankshaft center line. In one embodiment, the input shaft is in-line with the output shaft. In another embodiment, the input shaft is out-of-line with the output shaft.

Continuously variable transmissions generally utilize a pair of adjustable pulleys, including a primary pulley and a secondary pulley. The primary pulley is connected to an engine and the secondary pulley is connected to the drive train of the vehicle, typically through a clutch. One example of such a continuously variable transmission ("CVT") is shown in Smirl, U.S. Pat. No. 4,433,594 entitled "Variable Pulley Transmission" and incorporated herein by reference.

Generally, a drive belt interconnects the pulleys. Specifically, the drive belt transfers power from the primary pulley to the secondary pulley, i.e., from the engine to the drive train, by means of frictional contact between the drive belt and the pulleys.

Each pulley is constructed from two flanges and each flange has a conical side surface to define a generally V-shaped gap between the flanges. At least one of the flanges is movable along the axis of the shaft to allow the gap between the flanges to be varied. In such a fashion the transmission ratio of the CVT can be varied, i.e., changing the effective gap width between the flanges of the two pulleys varies the radial position of the drive belt in each pulley. This allows for continuous adjustment of the drive ratio between the shafts and thus between the engine and the drive train.

Movement of the flanges is achieved generally through a hydraulic servo. Specifically, the servo has a fluid constraining chamber. Increasing fluid pressure in this chamber causes the flange to move axially and thus increases the effective diameter of the pulley As fluid pressure is decreased in this chamber, the flange moves along the shaft in the opposite direction due to the tension on the belt, thus decreasing the effective diameter of the pulley. Generally, the effective diameter of the primary pulley is moved in one direction as the effective diameter of the secondary pulley is moved in the opposite direction. A further and more detailed description of servo operation and flange movement may be found in Neuman et al. U.S. Pat. No. 5,006,092 entitled "Continuously Variable Transmission Power Train Configuration" and incorporated herein by reference. Various servo and flange configurations may be used to provide an adjustable pulley. Any suitable design known to those skilled in the art may be used.

In an automobile installation space constraints limit the volume into which a transmission can be installed and thus limit the availability of using a CVT. Because a typical CVT utilizes a pulley assembly constructed from two pulleys positioned on parallel shafts and linked with a belt, the minimum width required to install a CVT is determined by the size of the belt and pulley assembly. Rear wheel drive automobiles, however, offer only limited space in the transmission tunnel for the installation of a transmission, especially because the transmission tunnel in such automobiles is underneath the forward section of the passenger compartment. Typically, this space provides greater length than height or width. In the past, therefore, passenger space considerations have limited the use of a CVT system.

The present invention solves this problem by providing a compact CVT system. One embodiment of the present invention provides a compact arrangement for a CVT where the input and output shafts are coaxial to allow installation into a rear wheel drive automobile without modification to the transmission tunnel or without requiring additional gears or modified differentials on the drive train.

Another embodiment of the present invention provides a compact arrangement for a CVT where the variable ratio assembly is offset relative to the input shaft and the output shaft is in line with the secondary pulley of the variable ratio assembly.

SUMMARY OF THE INVENTION

The present invention provides a continuously variable transmission and power train system which has a compact layout. Generally, the continuously variable ratio assembly is offset relative to the engine crankshaft center line. In one embodiment of the present invention, the power input shaft to the CVT system is coaxial with a power output shaft from the CVT system, i.e., the axis of the power input shaft is in the same longitudinal direction as the axis of the power output shaft. Such a configuration allows the present invention to be installed into a rear wheel drive automobile configured to use a conventional multi-gear transmission without requiring modification to the transmission tunnel or to the drive train.

The continuously variable transmission assembly of this embodiment includes a pair of adjustable pulleys. A power input shaft inputs power into a first transfer gear assembly which transfers the power to a first adjustable pulley. Power is transferred from the first adjustable pulley to a second adjustable pulley through a belt. The second adjustable pulley is connected to a second transfer gear assembly that brings the power flow back in-line with the power input shaft. Rotation of the power input shaft and the power output shaft is in the same direction. This characteristic is important because it allows the present invention to directly replace conventional manual and automatic transmissions without the necessity of converting gear assemblies. A fluid torque input device, such as a torque converter, fluid coupling, or a wet or dry friction clutch, is provided on the power input shaft to provide for the smooth transfer of power from the engine to the power input shaft and in some circumstances energy savings at idle. A hydraulic pump is further provided on the power input shaft, after the fluid torque input device but before the first transfer gear assembly, to provide hydraulic pressure for use to control the variator assembly. Finally, a compound planetary forward and reverse gear assembly having a clutch and brake band is provided on the power output shaft to provide neutral and reverse gears and energy savings when the vehicle coasts.

In another embodiment of the present invention, the longitudinal axis of the power input shaft to the CVT system is offset relative to the longitudinal axis of the power output shaft. The longitudinal axis of the power output shaft is coaxial or in the stone longitudinal direction of the shaft carrying the second adjustable pulley of the continuously variable ratio assembly. Since the power input shaft is offset relative to the variable ratio assembly, either an input idler gear is provided or the rear axle differential is modified so that the final drive direction is in the same direction as the power input shaft.

In operation, a power input shaft inputs power into a first transfer gear assembly that includes an input idler gear, which transfers power to the first adjustable pulley of the variable ratio assembly. Power is transferred from the first adjustable pulley to the second adjustable pulley of the variable ratio assembly in the same direction as the power input shaft through a belt. The second adjustable pulley is connected to the power output shaft through a compound planetary forward and reverse gear assembly having a clutch and brake band.

Alternatively, where the input idler gear is not provided, the power input shaft inputs power into a first transfer gear assembly that transfers power to the first adjustable pulley of the variable ratio assembly. Power is transferred from the first adjustable pulley to the second adjustable pulley of the variable ratio assembly through a belt. The second adjustable pulley drives the output shaft in the opposite direction as the power input shaft. In this case, the differential is modified to provide a drive direction that is in the same direction as the power input shaft.

For a better understanding of these and other objects and aspects of the invention, reference should be made to the following detailed description taken in conjunction with the accompanying drawings.

DETAILED DESCRIPTION OF THE DRAWINGS

Figure 1:
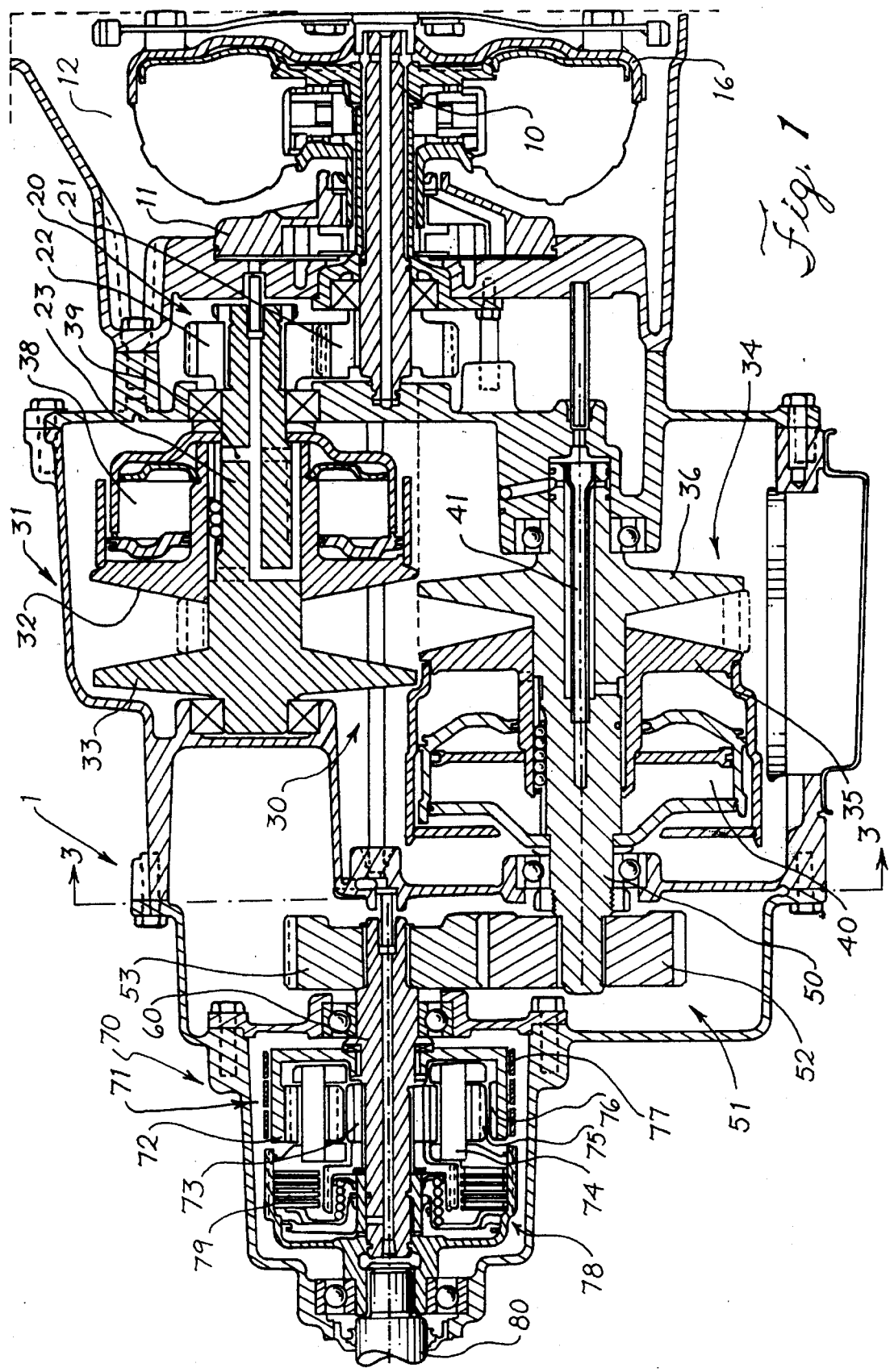
FIG. 1 is a sectional view of one embodiment of the continuously variable transmission system of the present invention.
Figure 2:
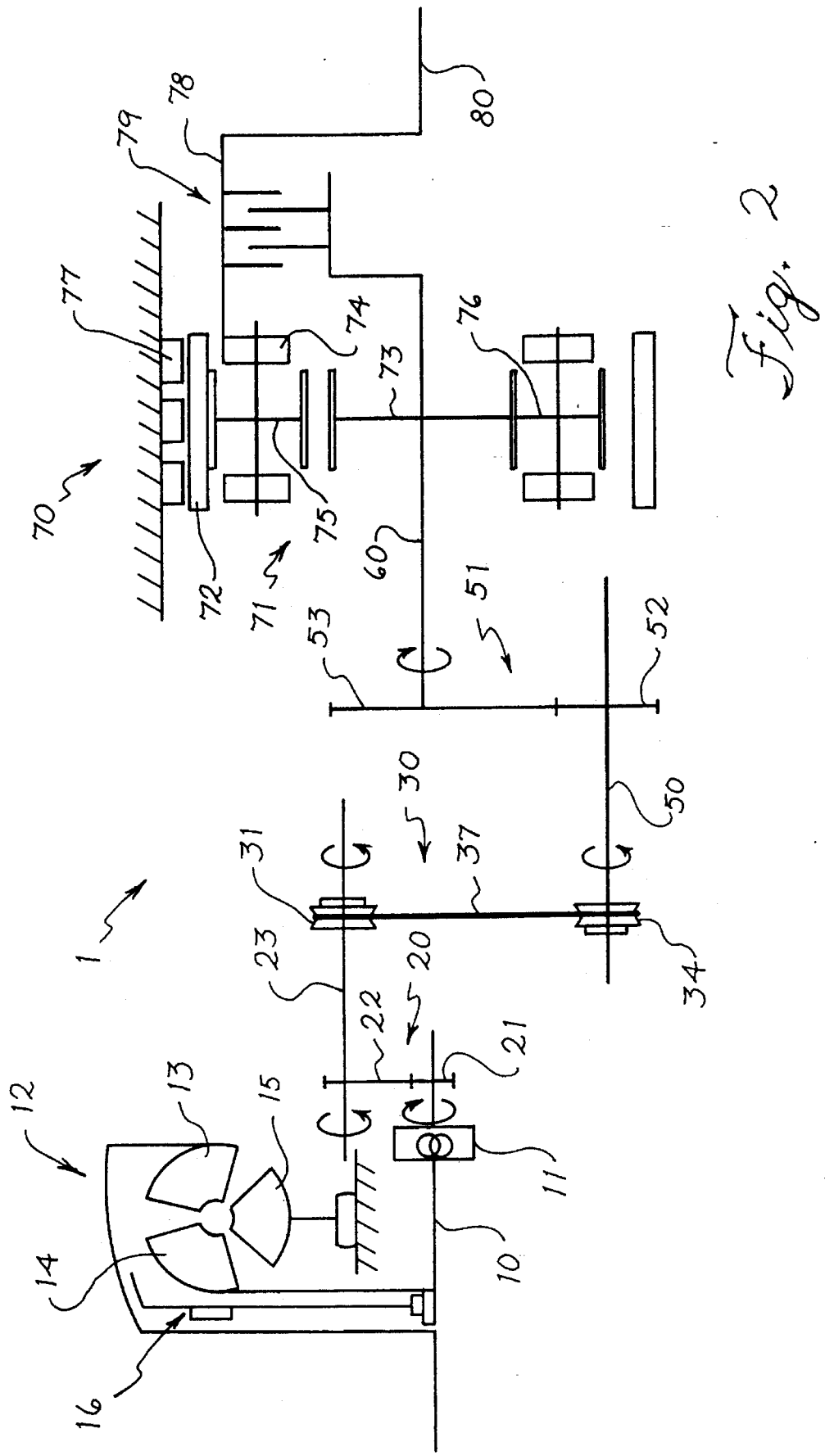
FIG. 2 is a schematic representation of the continuously variable transmission system shown in FIG. 1.

One embodiment of a compact CVT system, generally designated 1 is shown in FIGS. 1 and 2. While FIGS. 1 and 2 present a detailed depiction of a compact CVT system 1 according to one embodiment of the present invention, the operation of such a system can be more fully understood by reference to Neuman et al., U.S. Pat. No. 5,006,092, entitled "Continuously Variable Transmission Power Train Configuration" and to Smirl, U.S. Pat. No. 4,433,594, entitled "Variable Pulley Transmission", both CVT system 1 is connected to a power input, typically an engine (not shown), by input shaft 10. Disposed between the power input and the input shaft 10 is a torque converter 12 to provide a smooth transfer of torque from the power input to the input shaft 10.

The input shaft 10 has a hydraulic pump 11 to provide hydraulic pressure used to control the CVT system 1, explained in further detail below. The input shaft 10 is connected to a first transfer gear assembly 20 made up of gears 21 and 22 disposed on the input shaft 10 and the first intermediate shaft 23 respectively. Intermediate shaft 23 drives the continuously variable ratio assembly 30 since the shaft 23 carries the first adjustable pulley 31 which is connected to the second adjustable pulley 35 by a belt 37. The second adjustable pulley 34 is carried by the second intermediate shaft 50. Adjustable pulleys 31 and 34 are constructed from flanges 32, 33 and 35, 36 respectively, and are more fully described below.

The second intermediate shaft 50 is connected to the second transfer gear assembly 51 made up of gears 52 and 53 disposed on the second intermediate shaft 50 and the third intermediate shaft 60 respectively. The third intermediate shaft 60 is connected to the output shaft 80 through a compound gear system 70. The gear system 70 includes a compound planetary gear set 71, a brake band 77, and a direct clutch 79 to provide neutral, forward, and reverse gears, described in further detail below. Through such a compact arrangement, the input shaft 10 and output shaft 80 of the CVT system 1 are in-line, i.e., coaxial with each other. As a result, the in-line CVT system embodiment can be readily installed into rear wheel drive vehicles that previously used conventional transmissions.

As briefly discussed above, power is input to the input shaft 10 through the torque converter 12. The torque converter 12 is used to multiply the output torque of the engine at low r.p.m. as well as to isolate the torsional characteristics of the engine and thereby minimize vibrations and torque variations to the transmission. The torque converter 12 comprises a pump 13, turbine 14, stator 15, and converter lock-up clutch 16 for slip torque isolation through clutch slip and for high efficiency under clutch lock-up. These components are well known in the art. The pump 13 is connected to the power input, such as an engine (not shown). Turbine 14 is secured to the input shaft 10. Power is transferred through the torque converter 12 to the input shaft 10. Although in the preferred embodiment a torque converter 12 is used, any other suitable torque input device may be used instead, such as a fluid coupling, wet friction clutch or a dry friction clutch.

Figure 3:
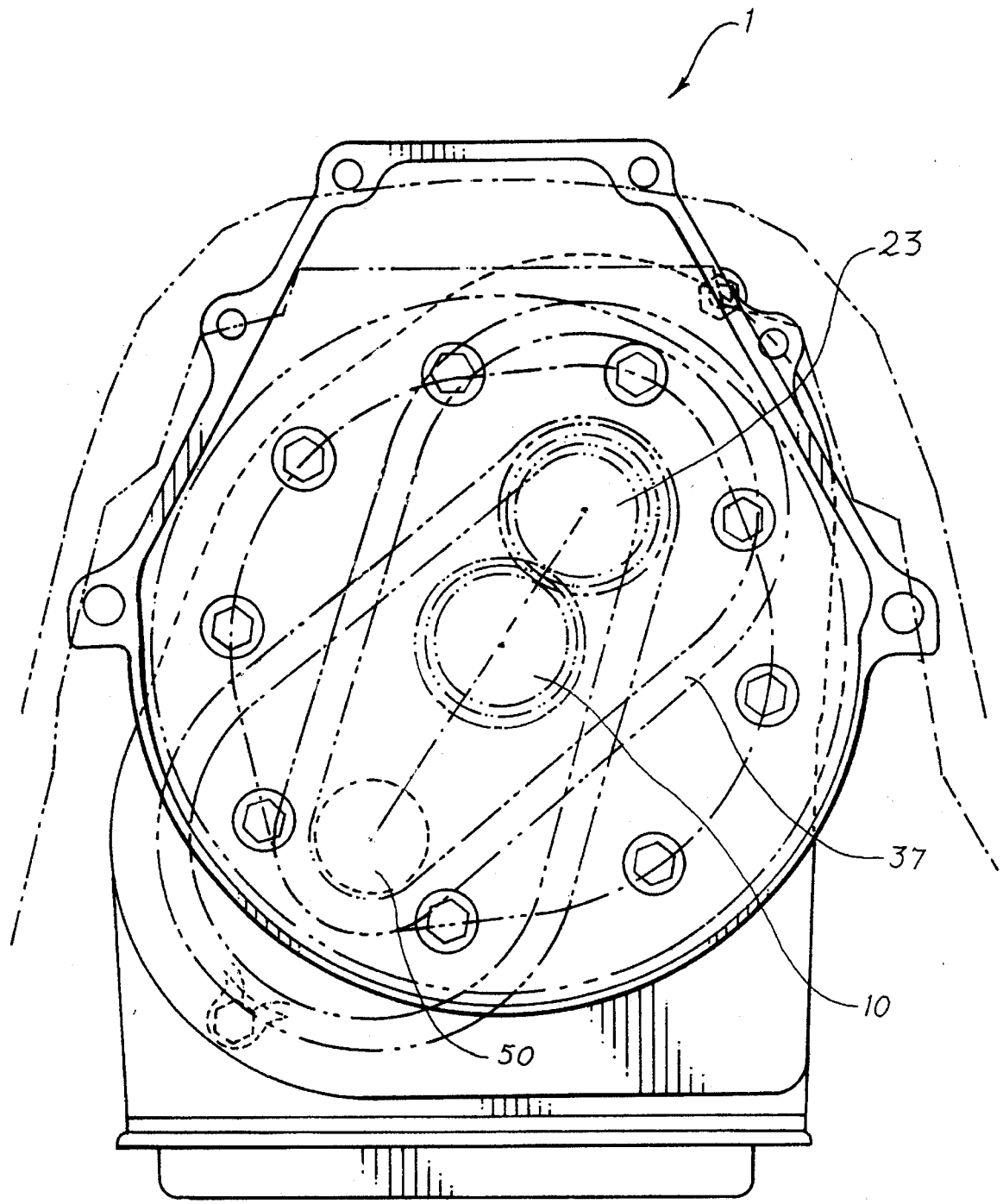
FIG. 3 is a sectional view of the continuously variable transmission system shown in FIG. 1 along the line 3—3.

The input shaft 10 connects at the end opposite the torque converter 12 to the first transfer gear assembly 20. Specifically, the input shaft 10 has a transfer gear 21 splined at the end opposite the torque converter 12. Transfer gear 21 engages transfer gear 22, which is splined to the end of the first intermediate shaft 23. Thus, through the first transfer gear assembly 20, power from the input shaft 10 is transferred to the first intermediate shaft 23 and out-of-line to the input shaft 10, as best viewed in FIG. 3. It should be noted that the direction of rotation output by the input shaft 10 is reversed by the first transfer gear assembly 20, i.e., the direction of rotation of the first intermediate shaft 23 is opposite to the direction of rotation of the input shaft 10, having been reversed by the gear assembly 20.

Power from the first intermediate shaft 23 is fed to a continuously variable ratio assembly 30. The continuously variable ratio assembly 30 is constructed from a first adjustable pulley 31, carried by a first intermediate shaft 23, and a second adjustable pulley 34, carried by a second intermediate shaft 50. The adjustable pulleys 31 and 34 are linked by a belt 37. The belt 37 is preferably constructed from metallic links, and is of a construction well known in the art.

The first adjustable pulley 31 is constructed from a first movable flange 32 and a first fixed flange 33. The second adjustable pulley 34 is constructed from a second movable flange 35 and a second fixed flange 36.

As seen in FIG. 1, in the preferred embodiment, the first adjustable pulley 31 is constructed with a double area servo and the second adjustable pulley 34 is constructed with a single area servo. Any servo construction suitable and known to those skilled in the art may be used. The specific servo construction is not within the purview of the disclosed invention. Further details of servo construction for use in a CVT may be found in Haley et al., U.S. Pat. No. 5,180,339, entitled "Double Acting Secondary Sheave Servo For A Continuously Variable Transmission" assigned to the assignee of the present invention and incorporated herein by reference.

Figure 4:
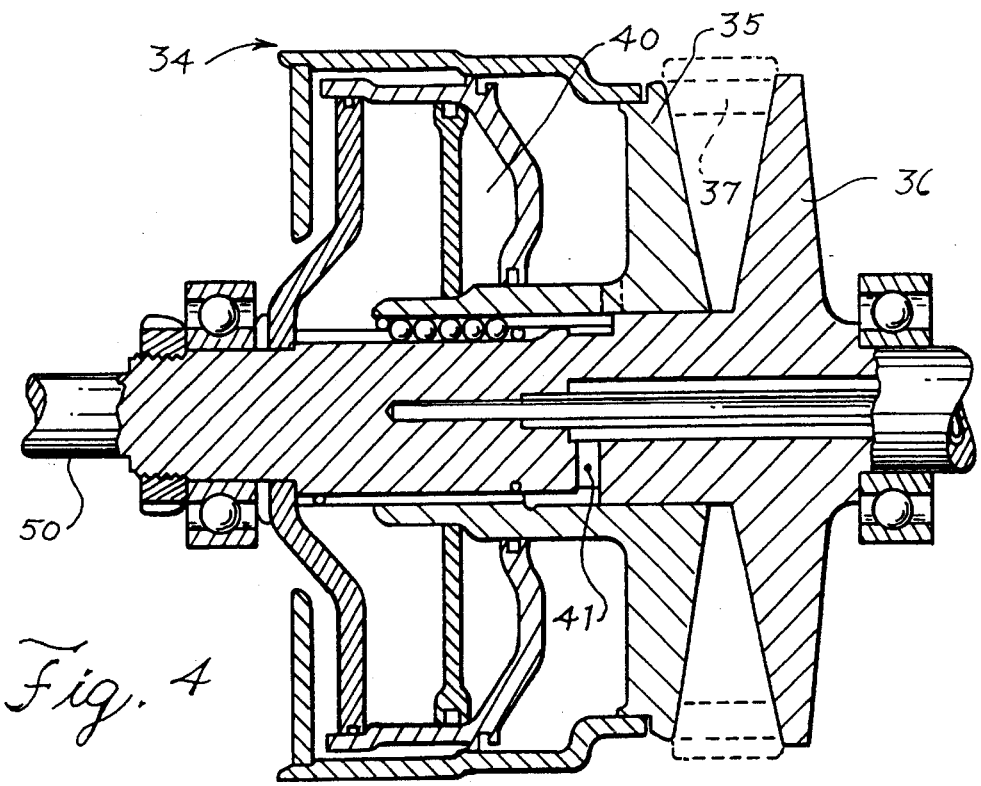
FIG. 4 is a cross-sectional view of an adjustable pulley showing one type of hydraulic control system useful in the system shown in FIG. 1 and in a first drive ratio.
Figure 5:
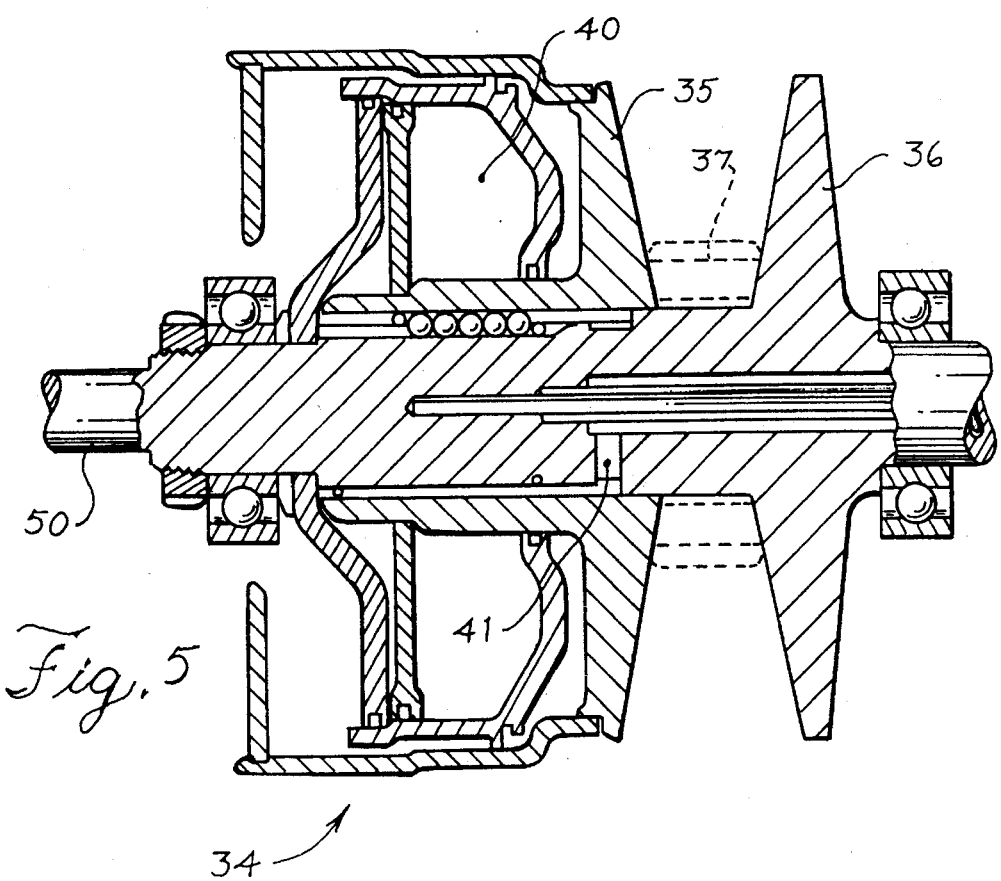
FIG. 5 is a cross-sectional view of an adjustable pulley useful in the system shown in FIG. 1 and showing one type of hydraulic control system in a second drive ratio.

The first adjustable pulley 31 and the second adjustable pulley 34 are hydraulically adjusted, although any method of pulley adjustment and control may be used. In the preferred embodiment, a piston 38 in the first adjustable pulley 31 communicates with a hydraulic reservoir (not shown) through passage 39. A piston 40 in the second adjustable pulley 34 communicates with a hydraulic reservoir (not shown) through passage 41. Varying the hydraulic pressure on pistons 38 and 40 causes movable flanges 32 and 35 to move. Movement of the movable flanges 32 and 35, in turn, causes the belt 37 to move within a gap defined by the flanges, as best seen in a comparison of FIGS. 4 and 5. In such a manner a continuously variable transmission ratio is accomplished. Further description and detail of the construction and operation of an adjustable pulley used in a CVT may be found in Mott, U.S. Pat. No. 5,244,437, "Double Acting Secondary Sheave Servo For A Continuously Variable Transmission", and Neuman et al., U.S. Pat. No. 5,006,092, entitled, "Continuously Variable Transmission Power Train Configuration", referred to above, each of which are incorporated herein by reference. The adjustable pulleys can be controlled by any system known in the art, such as Petzold et al., U.S. Pat. No. 4,811,225, entitled, "Ratio Control Technique For Continuously Variable Transmission" assigned to the assignee of the present invention and incorporated herein by reference. Any adjustable pulley construction and control suitable and known to those skilled in the art may be used. The specific adjustable pulley construction and control used is not within the purview of the disclosed invention.

Power is output from the second intermediate shaft 50 through the second transfer gear assembly 51 to the third intermediate shaft 60. Specifically, the second intermediate shaft 50 carries the transfer gear 52 which meshes with the transfer gear carried by the third intermediate shaft 60. Thus, the second gear assembly 51 transfers power back into line with the input shaft 10 to the output shaft 80 through a forward and reverse gear system 70.

It should also be noted that the direction of rotation output by the second intermediate shaft 50 is reversed by the second transfer gear assembly 51, i.e., the third intermediate shaft 60 rotates in the same direction as the input shaft 10. As mentioned previously, this is important because it allows substitution of the disclosed invention for conventional transmissions in a rear wheel drive automobile without unnecessary conversion gear assemblies.

A forward and reverse gear system 70 comprising a compound planetary gear set 71 and a direct clutch 79, provides forward, neutral, and reverse gears. The compound planetary gear set 71 is constructed from a sun gear 73 mounted to the third intermediate shaft 60, a ring gear 72, and a dual pinion carder 74 intermeshed between the sun gear 73 and the ring gear 72. A brake band 77 is mounted to a stationary mounting, such as the housing, and arranged to brake the rotation of the ring gear 72. The dual pinion carder 74 carries a pair of intermeshed gears 75 and 76 which are driven within the ring gear 72 by the sun gear 73. The dual pinion carder 74 is splined to the clutch housing 78 and is also engaged to a direct clutch 79. The clutch housing 78, in turn, is splined to the output shaft 80.

Operation of the gear system 70 is as follows. To achieve a forward gear, the direct clutch 79 is locked to the third intermediate shaft 60 and the brake band 77 is disengaged from the ring gear 72. Thus, clockwise rotation of the third intermediate shaft 60 causes the output shaft 80 to also rotate clockwise.

To achieve a reverse gear, the direct clutch 79 is unlocked and the brake band 77 is engaged to the ring gear 72. Thus, clockwise rotation of the sun gear 73 causes the dual pinion carrier 74 to rotate counterclockwise because the ring gear 72 is locked in place. The output shaft 80, which is splined to the dual pinion carder 74 through the clutch housing 78, is also rotated counterclockwise.

To achieve a neutral gear, both the direct clutch 79 and the brake band 77 are unlocked. In this configuration, rotation of the third intermediate shaft 60 is not transmitted to the output shaft 80.

Operation of this embodiment of the CVT system 1 is as follows. Power is transmitted from the power input, such as an engine (not shown), through the torque converter 12 to the input shaft 10. The torque converter 12 multiplies the input torque from the power input to the CVT system 1 and also isolates torsional spikes of the engine to provide smooth launch feel. The torque converter lock-up clutch 16 has slip control to allow operative optimization and high efficiency under fully locked up or semi-locked operational modes. As mentioned above, although the preferred embodiment uses a torque converter, any torque input device known in the art may be used, for example a friction clutch. The hydraulic pump 11, carried by the input shaft 10, provides pressure to the hydraulic system for use in operating the adjustable pulleys 31 and 34. Power from the input shaft 10 is fed through the first transfer gear assembly 20, noncoaxial to the input shaft 10, to the first adjustable pulley 31.

The belt 37 transmits power from the first adjustable pulley 31 to the second adjustable pulley 34. The adjustable pulleys can be controlled by any system known in the art, such as Petzold et al., U.S. Pat. No. 4,811,225, entitled "Ratio Control Technique For Continuously Variable Transmission" as discussed above. Power is further transmitted through the second transfer gear system 51 to the third intermediate shaft 60, that is coaxial with the input shaft 10 and the output shaft 80.

The third intermediate shaft 60 transfers power to the output shaft 80 through the compound planetary gear set 71 and the direct clutch 79. The forward gear is achieved by engaging the direct clutch 79 so that the third intermediate shaft 60 and the output shaft 80 are fixed together. The reverse gear is achieved by releasing the direct clutch 79 and engaging the brake band 77, thereby locking the ring gear 72. In this fashion, clockwise rotation from the third intermediate shaft 60, which carries the sun gear 73, causes the dual pinion carrier 74, which engages both the sun gear 73 and the ring gear 72, to rotate counterclockwise.

Figure 6:
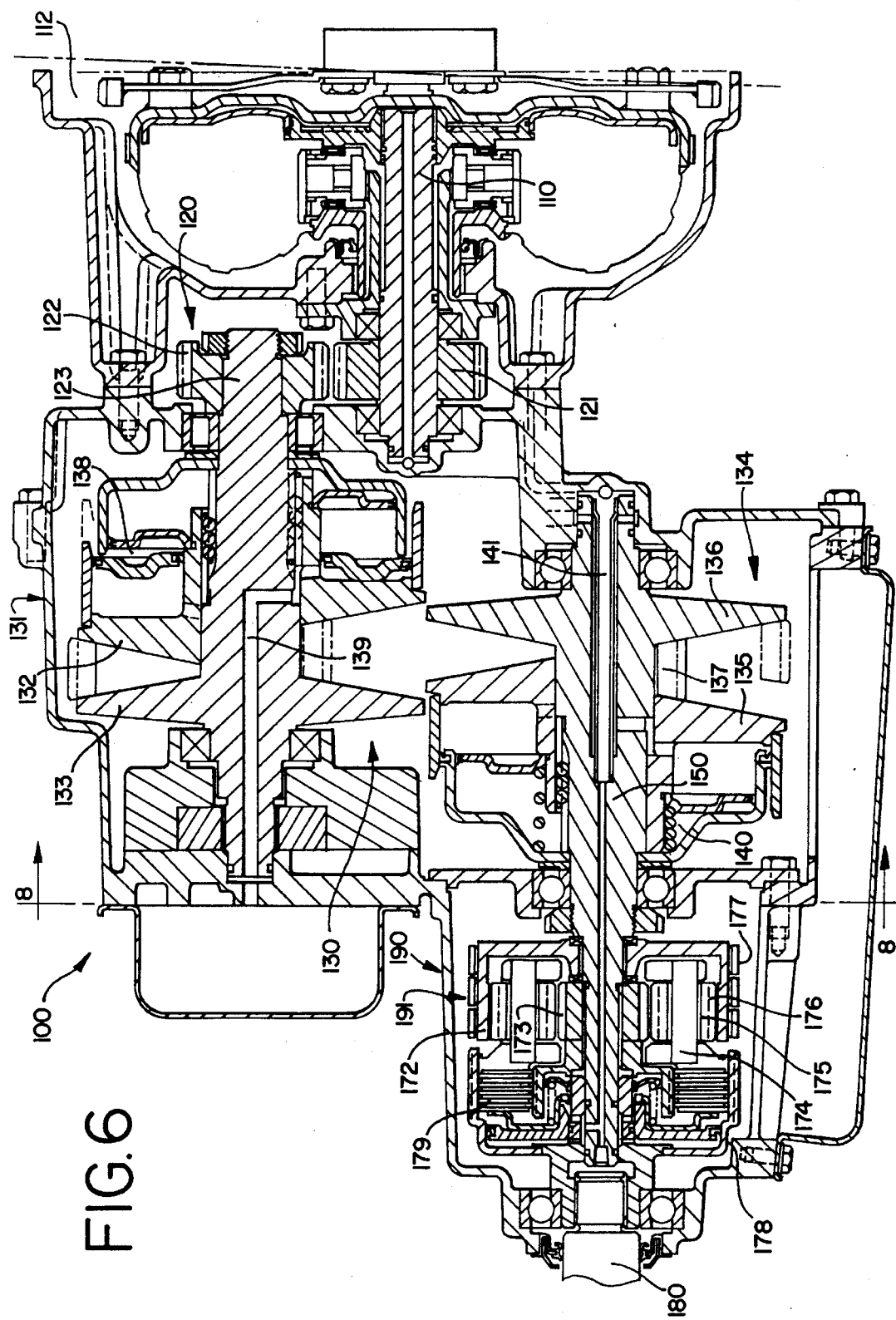
FIG. 6 is a sectional view of another embodiment of the continuously variable transmission system wherein an input idler gear is provided.
Figure 7:
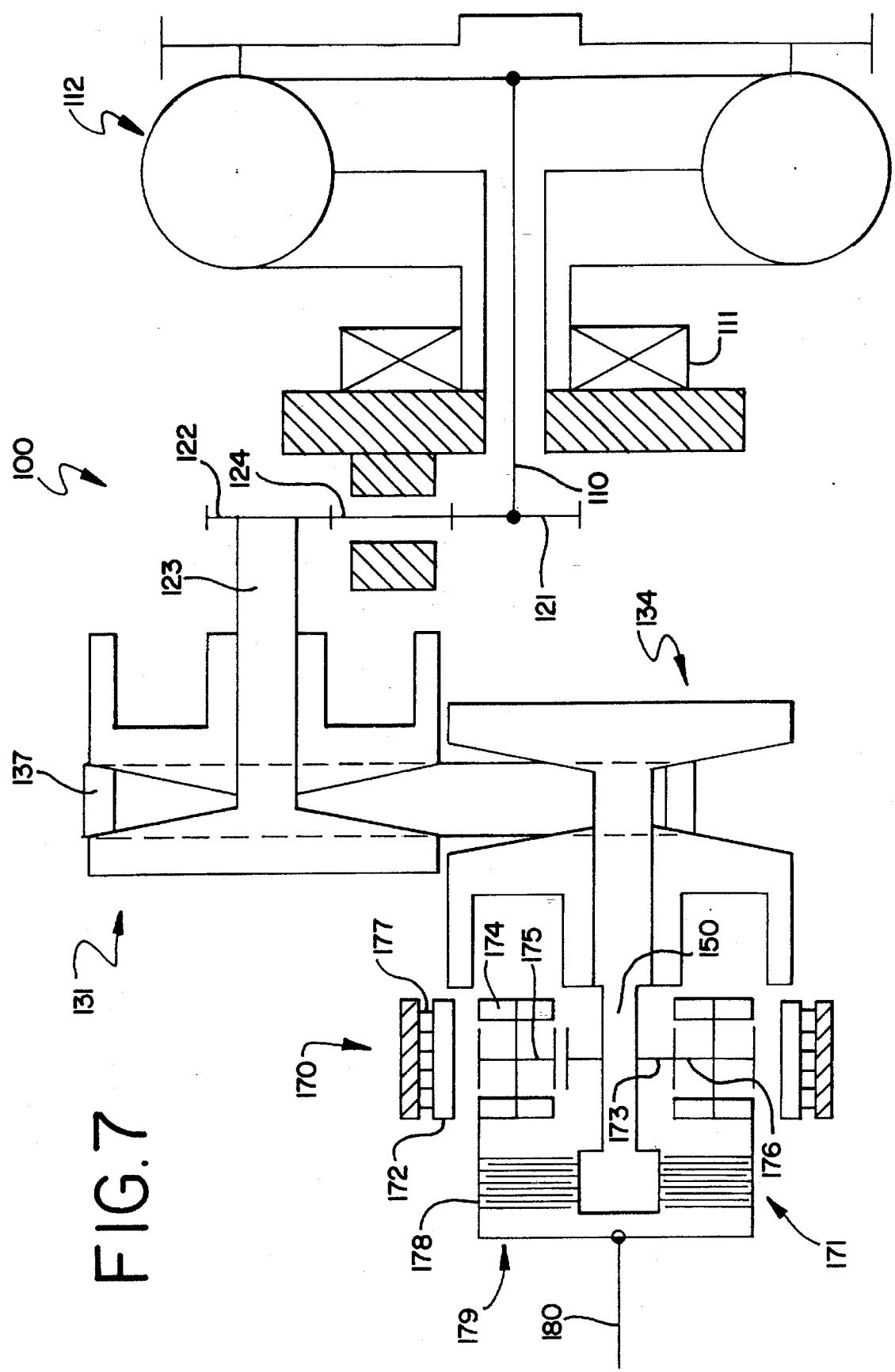
FIG. 7 is a schematic representation of the continuously variable transmission system of FIG. 6.
Figure 8:
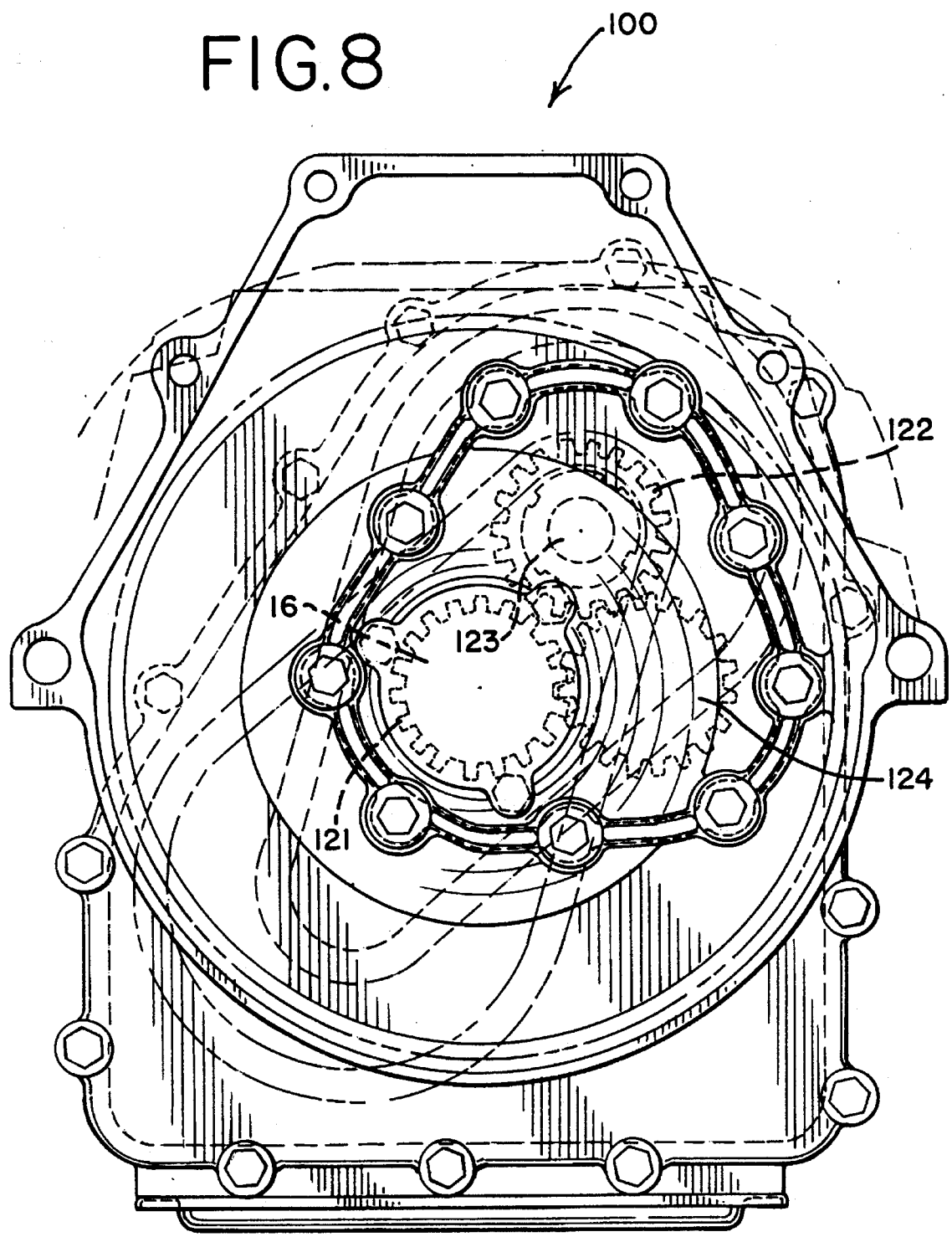
FIG. 8 is a sectional view of the continuously variable transmission system shown in FIG. 6 along line 8—8.

FIGS. 6 through 8 show another embodiment of the compact CVT system according to the present invention. In this embodiment, the longitudinal axis of the power input shaft 110 is offset relative to the longitudinal axis of the power output shaft 180. In addition, the longitudinal axis of the power output shaft 180 is coaxial or in the same longitudinal direction as the shaft 150 carrying the second adjustable pulley 134. The CVT system 100 is connected to a power input, typically an engine (not shown), by input shaft 110. Disposed between the power input and the input shaft 110 is a torque converter 112 to provide a smooth transfer of torque from the power input to the input shaft 110.

The input shaft 110 has a hydraulic pump 111 to provide hydraulic pressure used to control the CVT system 100, explained in further detail below. The input shaft 110 is connected to a first transfer gear assembly 120 made up of gears 121 and 122 disposed on the input shaft 110 and the first intermediate shaft 123 respectively, with an input idler gear 124 disposed between gears 121 and 122. Intermediate shaft drives the continuously variable ratio assembly 130 since the shaft 123 carries the first adjustable pulley 131 which is connected to the second adjustable pulley 134 by belt 137. The second adjustable pulley 134 is carried by the second intermediate shaft 150. Adjustable pulleys 131, and 134 are constructed from flanges 132, 133 and 135, 136 respectively, and are more fully described below.

The second intermediate shaft 150 is connected to the output shaft 180 through a forward and reverse gear system 170. The gear system 170 includes a planetary gear system 171, a brake band 177, and a direct clutch 179 to provide neutral, forward, and reverse gears, described in further detail below. Through such a compact arrangement, the input shaft 110 and output shaft 180 rotate in the same direction and CVT system can be readily installed into rear wheel drive vehicles.

As briefly discussed above, power is input to the input shaft 110 through the torque converter 112. The torque converter 112 is used to multiply the output torque of the engine at low r.p.m. as well as to isolate the torsional characteristics of the engine and thereby minimize vibrations and torque variations to the transmission. The torque converter 112 may include a pump, a turbine, a stator, and a converter lock-up clutch for slip torque isolation through clutch slip and for high efficiency under clutch lock-up. These components are well known in the art. The pump generally is connected to the power input, such as an engine (not shown) with the turbine being secured to the input shaft 110. Power is transferred through the torque converter 112 to the input shaft 110. Although in the preferred embodiment a torque converter 112 is used, any other suitable torque input device may be used instead, such as a fluid coupling, wet friction clutch or a dry friction clutch.

The input shaft 110, connects at the end opposite the torque converter 112 to the first transfer gear assembly 120. Specifically, the input shaft 110 has a gear 121 splined at the end opposite the torque converter 112. Transfer gear 121 engages idler input gear 124 which in turn engages transfer gear 122, which is splined to the end of the first intermediate shaft 123. Thus, through the first transfer gear assembly 120, power from the input shaft 110 is transferred to the first intermediate shaft 123 and out-of-line to the input shaft 110, as best viewed in FIGS. 6 and 7. It should be noted that the direction of rotation of the first intermediate shaft 123 is the same as the direction of rotation of the input shaft 110 due to the idler gear 124.

Power from the first intermediate shaft 123 is fed to a continuously variable ratio assembly 130 which can be identical to the variable ratio assembly 30 described above. The continuously variable ratio assembly 130 is constructed from a first adjustable pulley 131, carried by the first intermediate shaft 123, and a second adjustable pulley 134 carded by the second intermediate shaft 150. The adjustable pulleys 131 and 134 are linked by a belt 137. The belt 137 is preferably constructed from metallic links, and is of a construction well known in the art.

The first adjustable pulley 131 is constructed from a first movable flange 132 and a first fixed flange 133. The second adjustable pulley 134 is constructed from a second movable flange 135 and a second fixed flange 136. As seen in FIG. 6, in the preferred embodiment, the first adjustable pulley 131 is constructed with a double area servo and the second adjustable pulley 134 is constructed with a single area servo. As with the servo construction shown in FIG. 1, any servo construction suitable and known to those skilled in the art may be used.

The first adjustable pulley 131 and the second adjustable pulley 134 are hydraulically adjusted, although any method of pulley adjustment and control may be used. In the preferred embodiment, a piston 138 in the first adjustable pulley 131 communicates with a hydraulic reservoir (not shown) through passage 139. A piston 140 in the second adjustable pulley 134 communicates with a hydraulic reservoir (not shown) through passage 141. Varying the hydraulic pressure on pistons 138 and 140 causes movable flanges 132 and 135 to move. Movement of the movable flanges 132 and 135, in turn, causes the belt 137 to move within a gap defined by the flanges. In such a manner a continuously variable transmission ratio is accomplished. Further description and detail of the construction and operation of an adjustable pulley used in a CVT may be found in Mott, U.S. patent application Ser. No. 07/721,285 entitled, "Double Acting Secondary Sheave Serve For A Continuously Variable Transmission", and Neuman et al., U.S. Pat. No. 5,006,092, entitled, "Continuously Variable Transmission Power Train Configuration", referred to above, each of which are incorporated herein by reference. The adjustable pulleys can be controlled by any systems known in the art, such as Petzold et al., U.S. Pat. No. 4,811,225, entitled, "Ratio Control Technique For Continuously Variable Transmission" assigned to the assignee of the present invention and incorporated herein by reference. Any adjustable pulley construction and control suitable and known to those skilled in the art may be used. The specific adjustable pulley construction and control used is not within the purview of the disclosed invention.

Power is output from the second intermediate shaft 150 through the gear system 170 to the output shaft 180. A forward and reverse gear system 170 comprising a compound planetary gear set 171 and a direct clutch 179, provides forward, neutral, and reverse gears. The compound planetary gear set 171 is constructed from a sun gear 173 mounted to the second intermediate shaft 150, a ring gear 172, and a dual pinion carrier 174 intermeshed between the ring gear 172 and the sun gear 173. A brake band 177 is mounted to a stationary mounting, such as the housing, and arranged to brake the rotation of the ring gear 172. The dual pinion carder 174 carries a pair of intermeshed gears 175 and 176 which are driven within the ring gear 172 by the sun gear 173. The dual pinion carrier 174 is splined to the clutch housing 178 and is also engaged to a direct clutch 179. The clutch housing 178, in turn, is splined to the output shaft 180.

Operation of the compound planetary gear set 171 is as follows. To achieve a forward gear, the direct clutch 179 is locked to the second intermediate shaft 150 and the brake band 177 is disengaged from the ring gear 172. Thus, clockwise rotation of the second intermediate shaft 150 causes the output shaft 180 to also rotate clockwise.

To achieve a reverse gear, the direct clutch 179 is unlocked and the brake band 177 is engaged to the ting gear 172. Thus, clockwise rotation of the sun gear 173 causes the dual pinion carrier 174 to rotate counterclockwise because the ring gear 172 is locked in place. The output shaft 180, which is splined to the dual pinion carrier 174 through the clutch housing 178, is also rotated counterclockwise.

To achieve a neutral gear, both the direct clutch 179 and the brake bank 177 are unlocked. In this configuration, rotation of the second intermediate shaft 150 is not transmitted to the output shaft 180.

Operation of this embodiment of the CVT system 100 is as follows. Power is transmitted from the power input, such as an engine (not shown), through the torque converter 112 to the input shaft 110. The torque converter 112 multiplies the input torque from the power input to the CVT system 100 and also isolates torsional spikes of the engine to provide smooth launch feel. The torque converter lock-up clutch has slip control to allow operative optimization and high efficiency under fully locked-up or semi-locked operational modes. As mentioned above, although the preferred embodiment uses a torque converter, any torque input device known in the art may be used, for example a friction clutch. The hydraulic pump 111, carried by the input shaft 110, provides pressure to the hydraulic system for use in operating the adjustable pulleys 131 and 134. Power from the input shaft 110 is fed through the first transfer gear assembly 120 non-coaxial to the input shaft 110, to the first adjustable pulley 131 through the transfer gear 122 and input idler gear 124.

The belt 137 transmits power from the first adjustable pulley 131 to the second adjustable pulley 134 which is carried by the second intermediate shaft 150. The adjustable pulleys can be controlled by any system known in the art, such as Petzold et al., U.S. Pat. No. 4,811,225, entitled "Ratio Control Technique For Continuously Variable Transmission" as discussed above. Power is further transmitted through the second intermediate shaft 150 to the output shaft 180 through the compound planetary gear set 171 and the direct clutch 179. The forward gear is achieved by engaging the direct clutch 179 so that the second intermediate shaft 150 and the output shaft 180 are fixed together. The reverse gear is achieved by releasing the direct clutch 179 and engaging the brake 177, thereby locking the ring gear 172. In this fashion, clockwise rotation from the second intermediate shaft 150, which carries the sun gear 173, causes the dual pinion carrier 174, which is splined to the direct clutch 179 and engages both the sun gear 173 and the ring gear 172, to rotate counterclockwise.

Figure 9:
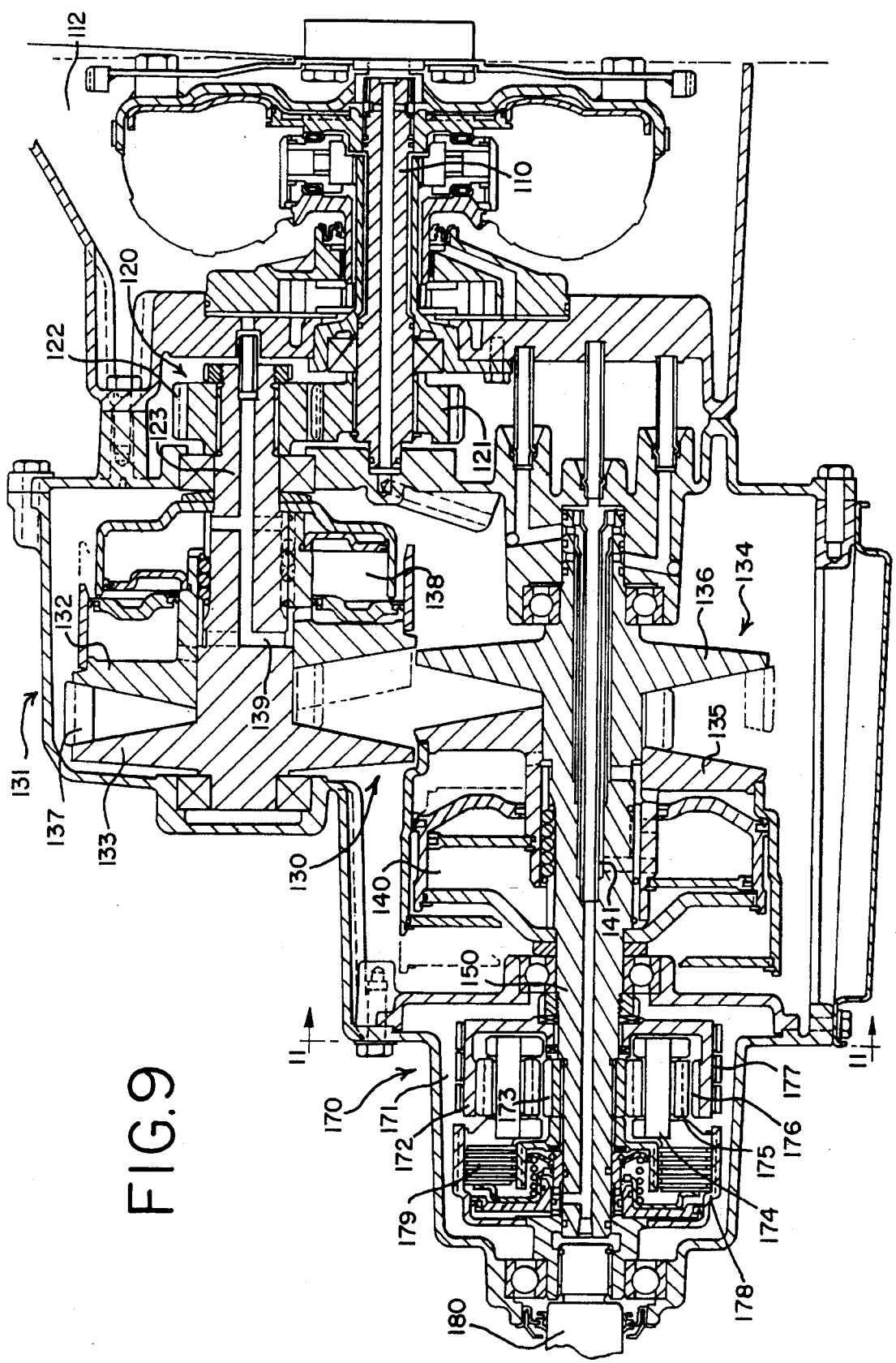
FIG. 9 is a sectional view of another embodiment of the continuously variable transmission system where opposite rotation of the output shaft will be provided at the differential.
Figure 10:
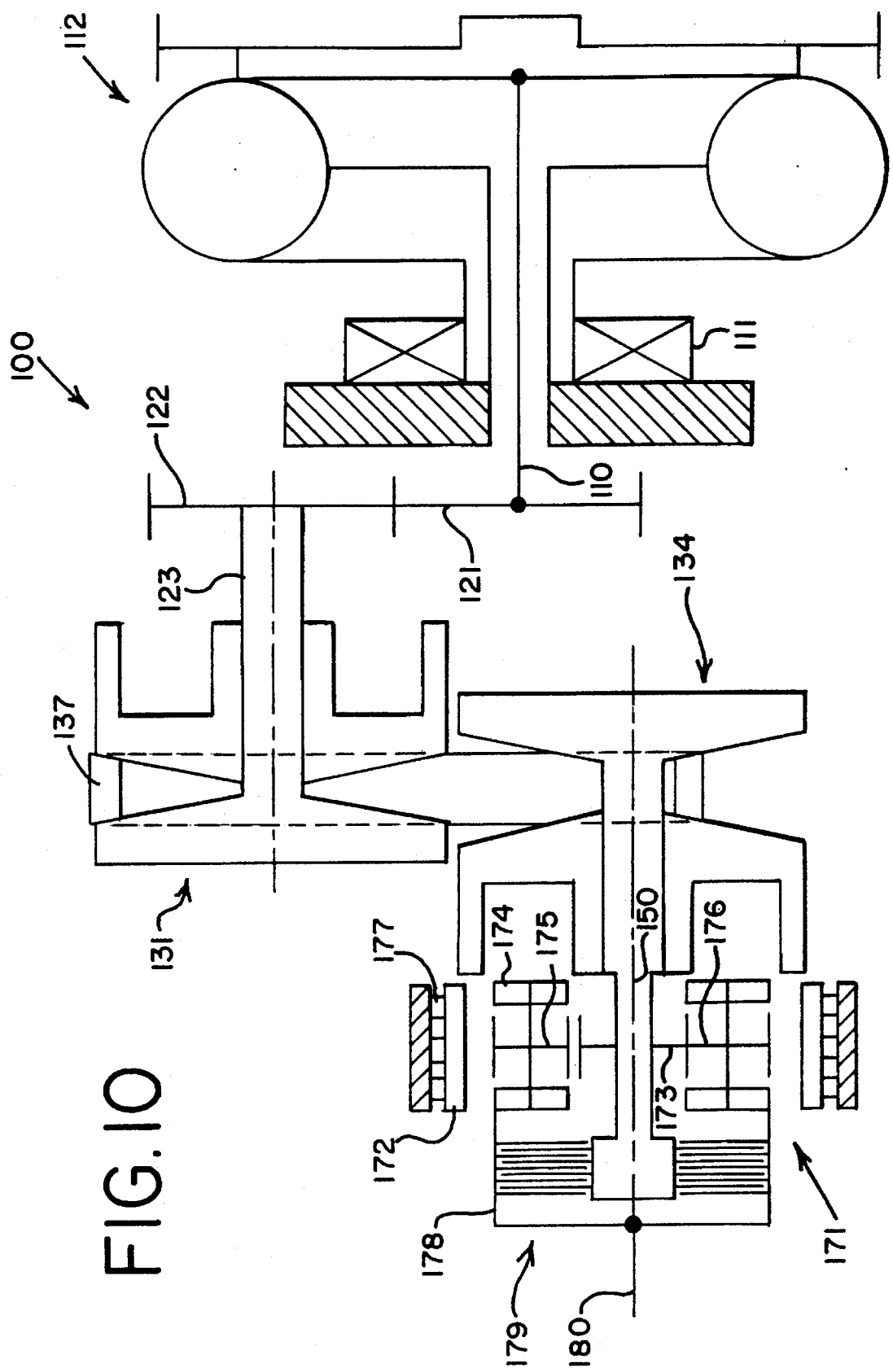
FIG. 10 is a schematic representation of the continuously variable transmission system of FIG. 9.
Figure 11:
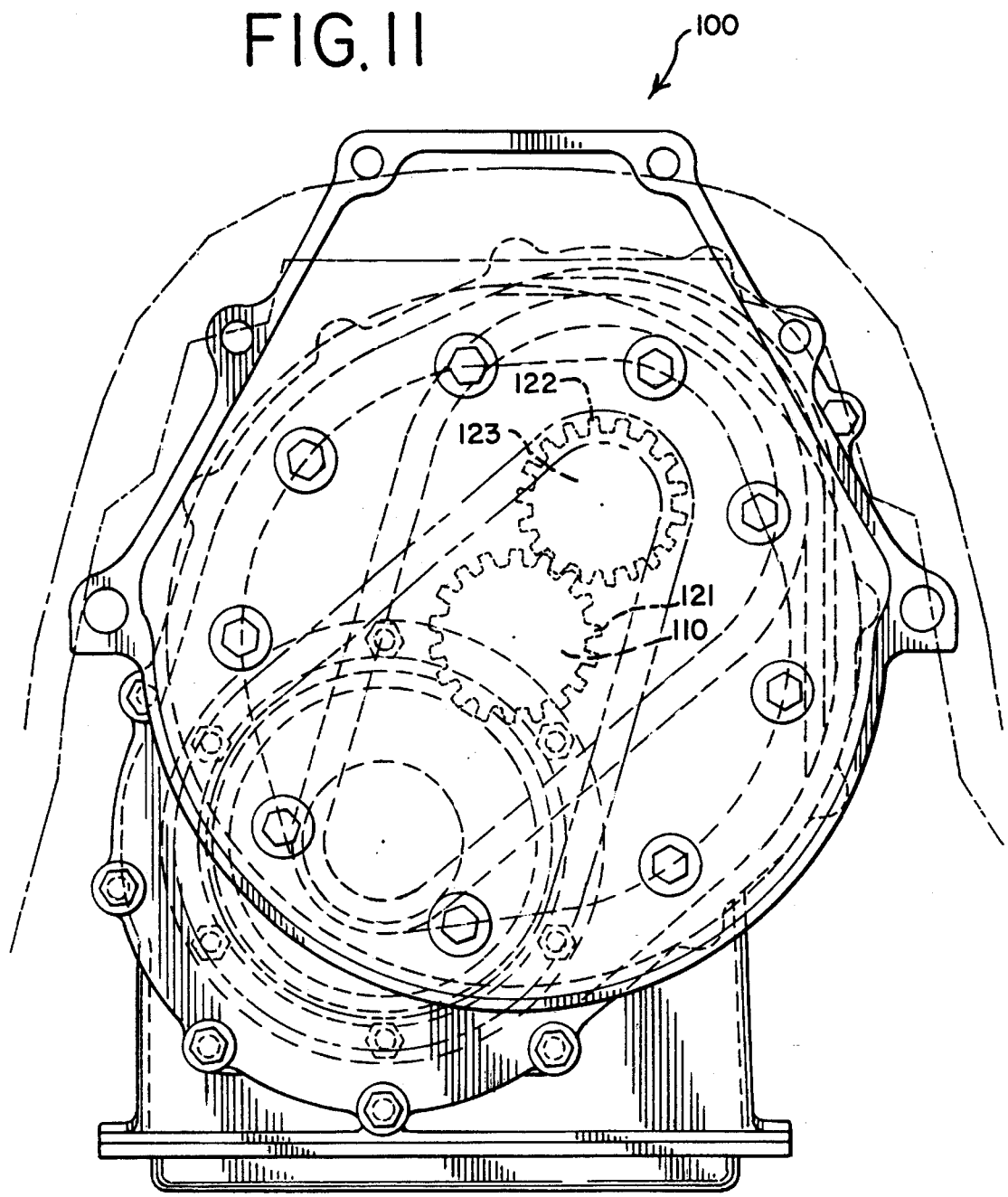
FIG. 11 is a sectional view of the continuously variable transmission system shown in FIG. 10 along line 11—11.

FIGS. 9 through 11 show another embodiment of the present invention wherein like numbers refer to like parts. In this embodiment, the longitudinal axis of the power input shaft 110 is offset relative to the longitudinal axis of the power output shaft 180. In addition, the longitudinal axis of the power output shaft 180 is coaxial or in the same longitudinal direction as the shaft 150 carrying the second adjustable pulley 134. In this embodiment, however, an input idler gear 124 is not present.

It will be understood by one skilled in the art that the direction of rotation of the output shaft 180 will be opposite the direction of the rotation of the input shaft 110, i.e., if the input shaft 110 rotates in a clockwise direction, the output shaft 180 rotates in a counterclockwise direction. Consequently, in this embodiment, the rear differential is modified so that the final drive rotation direction is in the same rotation direction as the power input shaft.

Like the embodiment shown in FIGS. 6–8 and described above, the CVT system 100 is connected to a power input, typically an engine (not shown), by input shaft 110. Disposed between the power input and the input shaft 110 is a torque converter 112 to provide a smooth transfer of torque from the power input to the input shaft 110 as fully explained above.

The input shaft 110 has a hydraulic pump 111 to provide hydraulic pressure used to control the CVT system 100, as explained above. The input shaft 110, connects at the end opposite the torque converter 112 to the first transfer gear assembly 120. Specifically, the input shaft 110 has a gear 121 splined at the end opposite the torque converter 112. Transfer gear 121 engages transfer gear 122, which is splined to the end of the first intermediate shaft 123. Thus, through the first transfer gear assembly 120, power from the input shaft 110 is transferred to the first intermediate shaft 123 and out-of-line to the input shaft 110, as best viewed in FIGS. 9 and 10. It should be noted that the direction of rotation of the first intermediate shaft 123 is opposite to the direction of rotation of the input shaft 110.

Power from the first intermediate shaft 123 is fed to a continuously variable ratio assembly 130 which may be identical to the variable ratio assembly 30 described above. The continuously variable ratio assembly 130 is constructed from a first adjustable pulley 131, carried by the first intermediate shaft 123, and a second adjustable pulley 134 carried by the second intermediate shaft 150. The adjustable pulleys 131 and 134 are linked by a belt 137. The belt 137 is preferably constructed from metallic links, and is of a construction well known in the art.

The first adjustable pulley 131 is constructed from a first movable flange 132 and a first fixed flange 133. The second adjustable pulley 134 is constructed from a second movable flange 135 and a second fixed flange 136. As seen in FIG. 9, in the preferred embodiment, the first adjustable pulley 131 is constructed with a double area servo and the second adjustable pulley 134 is constructed with a single area servo. As with the servo construction shown in FIG. 1, any servo construction suitable and known to those skilled in the art may be used.

The first adjustable pulley 131 and the second adjustable pulley 134 are hydraulically adjusted, although any method of pulley adjustment and control may be used. In the preferred embodiment, a piston 138 in the first adjustable pulley 131 communicates with a hydraulic reservoir (not shown) through passage 139. A piston 140 in the second adjustable pulley 134 communicates with a hydraulic reservoir (not shown) through passage 141. Varying the hydraulic pressure on pistons 138 and 140 causes movable flanges 132 and 135 to move. Movement of the movable flanges 132 and 135, in turn, causes the belt 137 to move within a gap defined by the flanges. In such a manner a continuously variable transmission ratio is accomplished. The adjustable pulleys can be controlled by any systems known in the art, as fully described above.

Power is output from the second intermediate shaft 150 through the forward and reverse gear system 170 to the output shaft 180. The forward and reverse gear system 170 comprises a compound planetary gear set 171 and a direct clutch 179, to provide forward, neutral, and reverse gears. The compound planetary gear set 171 is constructed from a sun gear 173 mounted to the second intermediate shaft 150, a ring gear 172, and a dual pinion carrier 174 intermeshed between the ring gear 172 and the sun gear 173. A brake band 177 is mounted to a stationary mounting, such as the housing, and arranged to brake the rotation of the ring gear 172. The dual pinion carder 174 carries a pair of intermeshed gears 175 and 176 which are driven within the ring gear 172 by the sun gear 173. The dual pinion carrier 174 is splined to the clutch housing 178 and is also engaged to a direct clutch 179. The clutch housing 178, in turn, is splined to the output shaft 180. Through such a compact arrangement, the input shaft 110 and output shaft 180 rotate in an opposite direction and with a modification to the rear differential, the CVT system can be readily installed into rear wheel drive vehicles.

Operation of the compound planetary gear set 171 is as follows. To achieve a forward gear, the direct clutch 179 is locked to the second intermediate shaft 150 and the brake band 177 is disengaged from the ring gear 172. Thus, clockwise rotation of the second intermediate shaft 150 causes the output shaft 180 to also rotate clockwise.

To achieve a reverse gear, the direct clutch 179 is unlocked and the brake band 177 is engaged to the ring gear 172. Thus, clockwise rotation of the sun gear 173 causes the dual pinion carrier 174 to rotate counterclockwise because the ring gear 172 is locked in place. The output shaft 180, which is splined to the dual pinion carrier 174 through the clutch housing 178, is also rotated counterclockwise.

To achieve a neutral gear, both the direct clutch 179 and the brake bank 177 are unlocked. In this configuration, rotation of the second intermediate shaft 150 is not transmitted to the output shaft 180.

Operation of this embodiment of the CVT system 100 is as follows. Power is transmitted from the power input, such as an engine (not shown), through the torque converter 112 to the input shaft 110. The torque converter 112 multiplies the input torque from the power input to the CVT system 100 and also isolates torsional spikes of the engine to provide smooth launch feel. The torque converter lock-up clutch has slip control to allow operative optimization and high efficiency under fully locked-up or semi-locked operational modes. As mentioned above, although the preferred embodiment uses a torque converter, any torque input device known in the art may be used, for example a friction clutch. The hydraulic pump 111, carded by the input shaft 110, provides pressure to the hydraulic system for use in operating the adjustable pulleys 131 and 134. Power from the input shaft 110 is fed through the first transfer gear assembly 120 non-coaxial to the input shaft 110, to the first adjustable pulley 131 through the transfer gear 122 and input idler gear 124.

The belt 137 transmits power from the first adjustable pulley 131 to the second adjustable pulley 134 which is carried by the second intermediate shaft 150. Power is further transmitted through the second intermediate shaft 150 to the output shaft 180 through the compound planetary gear set 171 and the direct clutch 179. The forward gear is achieved by engaging the direct clutch 179 so that the second intermediate shaft 150 and the output shaft 180 are fixed together. The reverse gear is achieved by releasing the direct clutch 179 and engaging the brake 177, thereby locking the ring gear 172. In this fashion, clockwise rotation from the second intermediate shaft 150, which carries the sun gear 173, causes the dual pinion carder 174, which is splined to the direct clutch 179 and engages both the sun gear 173 and the ring gear 172, to rotate counterclockwise.

The above description is given for the sake of explaining the basic features of the invention. Various substitutions and modifications, other than those cited, can be made without departing from the scope of the following claims.

What is claimed is:

1. A power transmission system to provide transmission of torque from a power input to a power output, comprising:

a. an input shaft disposed for operative connection to a power input;

b. an output shaft disposed for operative connection to a power output, the output shaft being substantially coaxial with the input shaft;

c. a first transfer gear assembly disposed for operative connection to the input shaft, the first transfer gear assembly being operatively connected to a first intermediate shaft;

d. a second transfer gear assembly disposed for operative connection to a second intermediate shaft, the second transfer gear assembly being operatively connected to a third intermediate shaft, the third intermediate shaft being substantially coaxial with and operatively connected to the output shaft; and e. a continuously variable transmission assembly comprising a first adjustable pulley mounted to the first intermediate shaft, the first adjustable pulley comprising a first flange fixed to the first intermediate shaft and a second flange mounted to the first intermediate shaft for axial movement along the first intermediate shaft, a second pulley mounted to the second intermediate shaft and a belt interconnecting the first adjustable pulley and the second pulley.

2. The system of claim 1 wherein the axis of the first intermediate shaft is spaced from the axis of the second intermediate shaft and the axis of the second intermediate shaft is spaced from the axis of the input shaft.

3. The system of claim 1 wherein the first transfer gear assembly comprises a first gear mounted to the first intermediate shaft and a second gear mounted to the input shaft, the second gear engaging the first gear to transfer power from the input shaft to the first intermediate shaft.

4. The system of claim 1 wherein the second transfer gear assembly comprises a first gear mounted to the third intermediate shaft and a second gear mounted to the second intermediate shaft, the second gear engaging the first gear to transfer power from the second intermediate shaft to the third intermediate shaft.

5. The system of claim 1 further comprising a forward and reverse gear system located on the third intermediate shaft.

6. The system of claim 5 wherein the forward and reverse gear system comprises a sun gear mounted to the third intermediate shaft, a ring gear, at least one planetary pinion meshed with the sun gear and the ring gear, a brake disposed to selectively brake the rotation of the ring gear, and a clutch selectively coupling the sun gear to the output shaft and the planetary pinion to the output shaft such that by engaging the brake and disengaging the clutch power is transmitted from the third intermediate shaft to the planetary pinion to the output shaft through the clutch and by disengaging the brake and engaging the clutch power is transmitted from the third intermediate shaft to the output shaft through the clutch.

7. A power transmission system to provide transmission of torque from a power input to a power output, comprising:
  a. an input shaft disposed for operative connection to a power input;
  b. an output shaft disposed for operative connection to a power output, the output shaft being substantially coaxial with the input shaft;
  c. a first transfer gear assembly disposed for operative connection to the input shaft, the first transfer gear being operatively connected to a first intermediate shaft;
  d. a second transfer gear assembly disposed for operative connection to a second intermediate shaft, the second transfer gear assembly being operatively connected to a third intermediate shaft, the third intermediate shaft being substantially coaxial with the output shaft;
  e. a continuously variable transmission assembly comprising a first adjustable pulley mounted to the first intermediate shaft, the first adjustable pulley comprising a first flange fixed to the first intermediate shaft and a second flange mounted to the first intermediate shaft for axial movement along the first intermediate shaft, a second pulley mounted to the second intermediate shaft and a belt interconnecting the first adjustable pulley and the second pulley; and
  f. a forward and reverse gear system linking the third intermediate shaft to the output shaft comprising a sun gear mounted to the third intermediate shaft, a ring gear, at least one planetary pinion meshed with the sun gear and the ring gear, a brake disposed to selectively brake the rotation of the ring gear, and a clutch selectively coupling the sun gear to the output shaft and the planetary pinion to the output shaft such that by engaging the brake and disengaging the clutch power is transmitted from the third intermediate shaft to the planetary pinion to the output shaft through the clutch and by disengaging the brake and engaging the clutch power is transmitted from the third intermediate shaft to the output shaft through the clutch.

8. The system of claim 7 wherein the first transfer gear assembly comprises a first gear mounted to the first intermediate shaft and a second gear mounted to the input shaft, the second gear engaging the first gear to transfer power from the input shaft to the first intermediate shaft.

9. The system of claim 7 wherein the second transfer gear assembly comprises a first gear mounted to the third intermediate shaft and a second gear mounted to the second intermediate shaft, the second gear engaging the first gear to transfer power from the second intermediate shaft to the third intermediate shaft.

10. A power transmission system to provide transmission of torque from a power input to a power output, comprising:
  a. an input shaft disposed for operative connection to a power input;
  b. an output shaft disposed for operative connection to a power output;
  c. a first transfer gear assembly disposed for operative connection to the input shaft and including an idler gear, the first transfer gear assembly being operatively connected to a first intermediate shaft;
  d. a second intermediate shaft substantially coaxial with and operatively connected to the output shaft; and,
  e. a continuously variable transmission assembly comprising a first adjustable pulley mounted to the first intermediate shaft, the first adjustable pulley comprising a first flange fixed to the first intermediate shaft and a second flange mounted to the first intermediate shaft for axial movement along the first intermediate shaft, a second pulley mounted to the second intermediate shaft and a belt interconnecting the first adjustable pulley and the second pulley.

11. The system of claim 10 wherein the axis of the first intermediate shaft is spaced from the axis of the second intermediate shaft and the axis of the second intermediate shaft is spaced from the axis of the input shaft.

12. The system of claim 10 wherein the first transfer gear assembly comprises a first gear mounted to the first intermediate shaft and a second gear mounted to the input shaft with the input idler gear disposed between the first and the second gear, the second gear engaging the idler gear which engages the first gear to transfer power from the input shaft to the first intermediate shaft.

13. The system of claim 10 further comprising a forward and reverse gear system located on the second intermediate shaft.

14. The system of claim 13 wherein the forward and reverse gear system comprises a sun gear mounted to the second intermediate shaft, a ring gear, at least one planetary pinion meshed with the sun gear and the ring gear, a brake disposed to selectively brake the rotation of the ring gear, and a clutch selectively coupling the sun gear to the output shaft and the planetary pinion to the output shaft such that by engaging the brake and disengaging the clutch, power is transmitted from the second intermediate shaft to the planetary pinion to the output shaft through the clutch and by disengaging the brake and engaging the clutch, power is transmitted from the second intermediate shaft to the output shaft through the clutch.

15. A power transmission system to provide transmission of torque from a power input to a power output, comprising:
  a. an input shaft disposed for operative connection to a power input;
  b. an output shaft disposed for operative connection to a power output;
  c. a first transfer gear assembly disposed for operative connection to the input shaft and including an idler gear, the first transfer gear being operatively connected to a first intermediate shaft;
  d. a second intermediate shaft substantially coaxial with the output shaft;
  e. a continuously variable transmission assembly comprising a first adjustable pulley mounted to the first intermediate shaft, the first adjustable pulley comprising a first flange fixed to the first intermediate shaft and a second flange mounted to the first intermediate shaft for axial movement along the first intermediate shaft, a second pulley mounted to the second intermediate shaft and a belt interconnecting the first adjustable pulley and the second pulley; and
  f. a forward and reverse gear system linking the second intermediate shaft to the output shaft comprising a sun gear mounted to the second intermediate shaft, a ring gear, at least one planetary pinion meshed with the sun gear and the ring gear, a brake disposed to selectively brake the rotation of the ring gear, and a clutch selectively coupling the sun gear to the output shaft and the planetary pinion to the output shaft such that by engaging the brake and disengaging the clutch, power is transmitted from the second intermediate shaft to the planetary pinion to the output shaft through the clutch and by disengaging the brake and engaging the clutch, power is transmitted from the second intermediate shaft to the output shaft through the clutch.

* * * * *